A. H. NEULAND.
ALTERNATING CURRENT MOTOR.
APPLICATION FILED AUG. 7, 1915.
1,233,900.
Patented July 17, 1917.
2 SHEETS—SHEET 1.
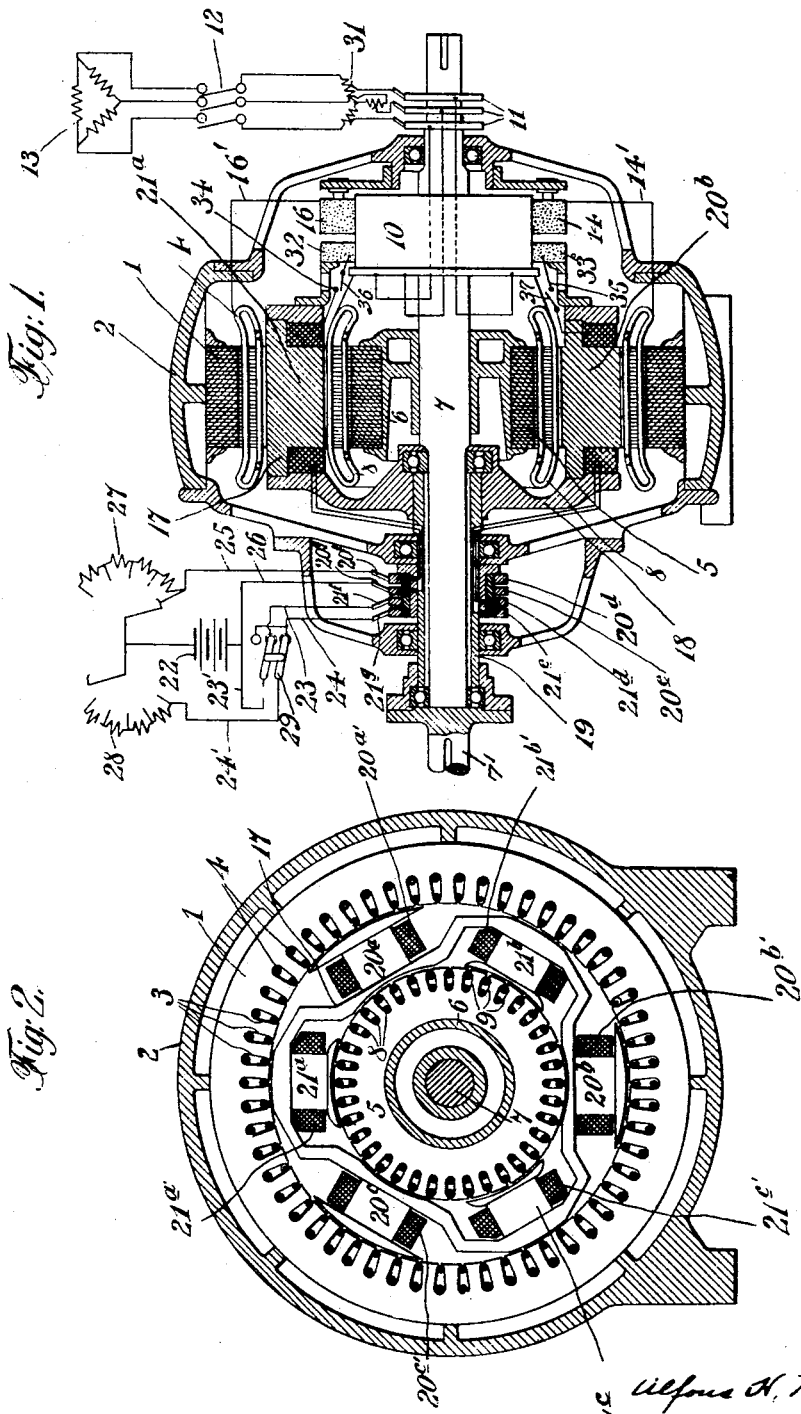
INVENTOR
Alfons H. Neuland
BY
Rosenbaum, Stockbridge & Borst
ATTORNEYS

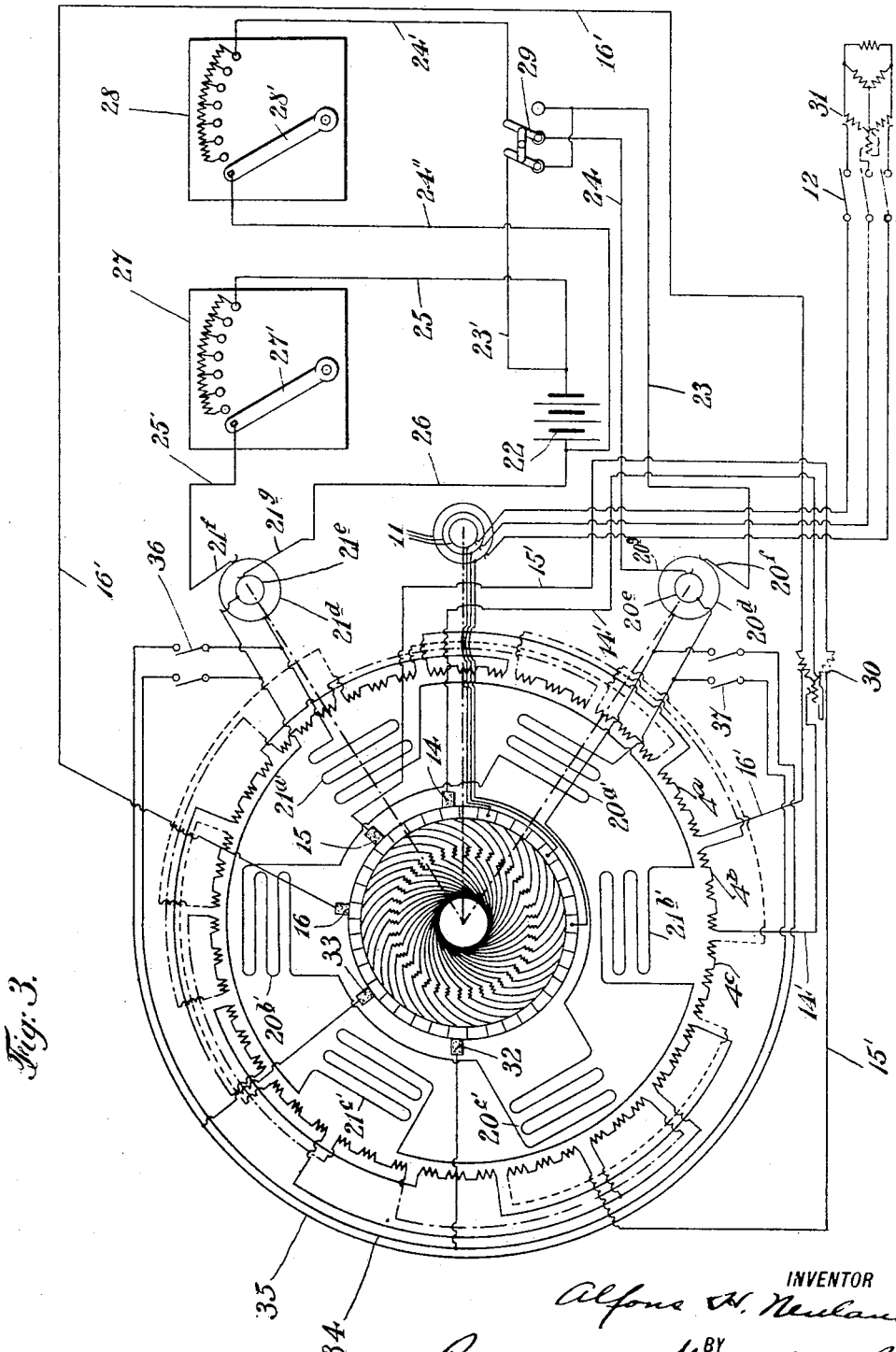

UNITED STATES PATENT OFFICE.

ALFONS H. NEULAND, OF NEW YORK, N. Y.

ALTERNATING-CURRENT MOTOR.

1,233,900.  Specification of Letters Patent.  Patented July 17, 1917.

Application filed August 7, 1915. Serial No. 44,244.

*To all whom it may concern:*

Be it known that I, ALFONS H. NEULAND, a subject of the Czar of Russia, residing at the city of New York, in the borough of Manhattan and State of New York, have invented certain new and useful Improvements in Alternating-Current Motors, of which the following is a full, clear, and exact description.

My invention relates to dynamo-electric machines and particularly to alternating current motors. An object of my invention is to provide an adjustable speed alternating current motor, in which the speed adjustment may be reliably and easily effected with simple and convenient means. Another object is to provide means in such a machine for varying the power factor thereby permitting the motor to correct the power factor of the supply system. Another object is to provide means for obtaining a direct current in such a machine and utilizing the same for self-excitation or other purposes. Other objects are convenience and reliability in operation and manipulation, and simplicity, strength and durability of construction. Still other objects and advantages will appear from the following description.

In my former United States application Serial No. 855,873, filed August 8, 1914, I have disclosed and claimed a dynamo-electric machine which may be operated as an adjustable speed alternating current motor, although the use of the machine as a power transmission device is primarily set forth in my said application. That device is composed of three elements: a rotatable armature member with a direct current armature winding thereon carrying a commutator which is engaged by stationary polyphase brushes; and a stationary element concentric with and surrounding the armature and provided with a polyphase winding connected with the polyphase brushes on the commutator; and a rotatable field element comprising a plurality of field poles disposed between the stationary element and the armature, together with a source of energizing current for the field poles.

That device when operated as a motor has an alternating current supplied to the armature, and the armature is brought up to speed and synchronized with the field of the rotatable field element, and thereafter the armature will remain in synchronism with the field. Power is taken off from the shaft of the rotatable field member. The direction of rotation of the field power element is reversed relative to that of the armature by reversing the leads connecting the stationary brushes with the stator winding.

The speed of the power producing field element is adjusted by changing the voltage relation between the armature and stator, which is effected by changing the turns in series in the stator winding. This regulation of the speed requires a polyphase controlling switch of sufficient capacity to carry the power current, while a switch for reversing the power leads is required to reverse the direction of rotation.

In accordance with my present invention I dispense with the necessity of switching the power leads and thereby eliminate the large capacity switches. This invention is characterized by the employment of a field member having two flux components, one acting on the armature and the other on the stator, and, for the purpose of regulating the speed of the machine, my invention comprehends means for varying the strength of one flux component relative to that of the other. My invention also includes means for reversing the direction of one flux component relative to that of the other in order to reverse the motor. My invention also comprehends, as a means for adjusting the speed of the motor, in combination with two relatively variable flux components, means for varying the relationship between the potential impressed upon the armature windings and the counter-potential of the stator windings. This may be effected either by an auto-transformer inserted between the commutator brushes and the stator winding or one inserted between the source of alternating current and the armature winding, or by both. My invention also includes means for adjusting the power factor of the motor at will without interfering with its operation.

More specifically, the field member comprises a plurality of field magnets wound in two sets, one set being in inductive relation to the armature and constituting armature field poles, and the other being in inductive relation to the stator and constituting stator field poles, together with means for varying the relative strength and polarity of the two sets of field magnets. Preferably, these sets of field magnets are carried upon opposite sides of a rotatable magnetic ring, the ring having external and internal polar projections arranged in alternate relation with each other and forming the poles for the field magnets. The means for varying relative field strengths preferably consists of two rheostats disposed in the respective magnetizing circuits, and to reverse the relative direction of the magnetizing currents, a pole changer is preferably provided in one of the circuits.

My invention includes various other features of construction and arrangements and combinations of parts, as will hereinafter more fully appear. I shall now describe the illustrated embodiment of my invention and shall thereafter point out my invention in claims.

Figure 1 is a longitudinal central section of an alternating current motor embodying my invention, with a diagram of the supply circuit and of the magnetizing circuit for the fields.

Fig. 2 is a transverse central section of the same, showing the field structure in elevation, and Fig. 3 is a diagram of the electrical circuits.

In the illustrated construction, the stator 1 is laminated and annular in shape and is carried on the inside of the cylindrical portion 2 of the frame or casing. Suitable longitudinal slots 3 are provided at the inner periphery of the stator for the reception of the polyphase stator winding 4. The armature core 5 is laminated and mounted upon a hub 6 secured to the armature shaft 7. The armature winding 8 is embedded in suitable longitudinal slots 9 in the face of the armature core. The commutator 10 is also carried by the shaft 7 and rotates with the armature winding with which it is electrically connected, as shown. Three slip rings 11 on the shaft 7 are connected to the commutator, as shown in Figs. 1 and 3, and are arranged to be connected through a switch 12 to a source of polyphase alternating current 13. Instead of using polyphase current, the device may be operated from a source of single phase current, in which case only two of the slip rings need be used.

Polyphase brushes 14, 15 and 16 are carried by the frame of the machine and engage the commutator 10, as shown particularly in Fig. 3, and these brushes are connected through the leads 14', 15' and 16' to the respective phases of the stator winding 4.

The field member comprises two sets of field magnets carried by the magnetic ring 17, which is disposed in the annular space between the stator and armature and is carried by a steel spider or bracket 18, which is fixed to a sleeve 19 rotatably surrounding one end of the shaft 7 and coupled to the driven shaft 7'. The ring 17 has six integral radially extending steel poles arranged alternately internally and externally thereof, the intermediate portions of the ring forming magnetic yokes connecting the pole faces on one side with the adjacent pole faces on the other side. The poles extend substantially across the annular space between the armature and stator and the yoke portions of the ring 17 connect the inner ends of the three external poles, numbered $20^a$, $20^b$ and $20^c$, with the outer ends of the three internal poles numbered $21^a$, $21^b$ and $21^c$. These two sets of poles form the cores of two sets of field magnets arranged in inductive relation to the stator and armature, respectively. The field coils $20^{a\prime}$, $20^{b\prime}$ and $20^{c\prime}$ of the stator or external magnets are wound in a like direction and connected in series, and similarly the field coils $21^{a\prime}$, $21^{b\prime}$ and $21^{c\prime}$ of the armature or internal coils are wound in the same direction and opposite to that of the stator field coils and are connected in series. Two pairs of slip rings $20^d$, $20^e$ and $21^d$, $21^e$, on the sleeve 19 are connected to the respective sets of field magnets. The source of magnetizing current is shown as a battery 22, the slip rings being connected therewith by brushes $20^f$, $20^g$ and $21^f$, $21^g$, respectively, and leads 23, 24, 25 and 26, respectively (see Fig. 1). The two sets of field magnets are thus independently energized, and to vary the relative field strengths rheostats 27 and 28 are provided in the respective field circuits, while to reverse the relative direction of the two magnetizing currents, a pole changer 29 is provided in the stator field circuit.

When the stator and armature field magnets are equally and oppositely excited, the flux of each adjacent pair of field poles traverses both pole pieces and the connecting portions of the armature and stator, without traversing any of the yoke portions of the ring forming adjacent poles. Upon weakening the current in the internal or armature field coils, the flux through the armature is decreased while that through the stator is not changed, the difference between the stator and armature fluxes traversing the ring. The stator flux is substantially unaffected even when the armature field is entirely cut off, substantially all of the stator flux in that event passing through the yoke portions of the ring; and when the current in the armature field coils is reversed, the flux of the stator field magnets still remains the same, but the yoke portions of the ring then carry both the flux of the stator magnets and the flux of the armature field magnets. Therefore, the flux of either the armature or the stator field magnets may be varied or reversed without materially affecting the other.

The armature winding 8 is a series winding and is wound for six poles. The current fed to the armature is commutated by the commutator 10 and conducted to the stator windings 4 through the stationary polyphase spaced brushes 14, 15 and 16, and their respective leads, as above described. These brushes are so arranged that polyphase currents are collected and introduced into the stator winding. The stator winding is preferably arranged for as many poles as is the armature winding and connected for as many phases as are the currents collected from the commutator brushes. In the illustrated embodiment, the stator winding 4 is a three-phase winding, the coils 4$^a$ (shown in full lines) belonging to one phase; the coils 4$^b$ (shown in dot and dash lines) belonging to the second phase; and the coils 4$^c$ (shown in dotted lines) belonging to the third phase.

The polyphase currents collected at the brushes circulate through the stator winding and create a revolving field having the same angular velocity as that of the field member. The brushes are connected to the stator winding so that the stator current produces a torque upon the stator field. The field of the stator current is in electrical space quadrature to the stator field of the field member at standstill of the field member, and this quadrature relation remains at all speeds of the field member and maintains a torque as long as the armature E. M. F. predominates over the stator counter E. M. F. The direction of rotation of the field member depends upon the direction of the magnetizing current of the stator field magnets. If the torque of the stator field component of the field member is in opposition to that of the armature field component of the field member, the field member will be caused to rotate in the opposite direction to that in which it rotates when the two torques are in the same direction. The reversal of the pole changer 29 serves to reverse the stator field component and thereby the direction of rotation of the field member. It is manifest that the motor may also be reversed by reversing one phase of the A. C. supply and synchronizing the armature to run in the opposite direction.

To start the motor the alternating current is introduced into the armature winding by closing the switch 12, and the armature is brought up to speed and is synchronized with the armature field of the field member in any suitable manner, after which the armature will continue to rotate freely, always retaining synchronism with the armature field of the field member, whereupon the motor is ready to deliver power at the shaft of the field member. At start and low speeds of the power field member, i. e. the member from which power is taken off, the armature field of the field member is preferably weak, while the stator field of the field member may be fully excited to give the greatest torque. To effect this condition, the rheostat handle 28' will be moved to its farthest position toward the right from the position shown, the stator field of the field member being thereby fully energized, while the handle 27' of the armature field rheostat 27 is moved one step to the right, the armature field of the field member being thereby closed through all the resistance.

The energizing circuit for the armature field of the field member may be traced as follows: from battery 22, through lead 25, rheostat 27, lead 25', brush 21$^f$, slip ring 21$^d$, armature field coils 21$^{a\prime}$, 21$^{b\prime}$, 21$^{c\prime}$, slip ring 21$^e$, brush 21$^g$, and lead 26 back to the battery. The energizing circuit for the stator field of the field member may be traced as follows: from battery 22, through lead 23', contact of pole changer 29, lead 23, brush 20$^f$, slip ring 21$^d$, stator field coils 20$^{a\prime}$, 20$^{b\prime}$ and 20$^{c\prime}$, slip ring 20$^e$, brush 20$^g$, lead 24, contact of pole changer 29, lead 24', rheostat 28, and lead 24'', back to the battery.

In order to increase the speed of the power developing field member, the armature field magnets are gradually strengthened by moving the rheostat handle 27' step by step to the right. The speed of rotation of the field member may be adjusted by adjusting the strength of the stator field magnets, and the strength of the armature field magnets may be adjusted to vary the power factor of the device and cause it to operate at unity power factor, or to furnish a leading current to the main, thus correcting, if desired, the power factor of the supply system.

As previously stated, the speed may also be adjusted by varying the relationship between the potential impressed upon the armature winding and the counter-potential of the stator winding. For this purpose an auto-transformer 30 may be inserted between the commutator brushes 14, 15 and 16, and the stator winding 4. In this case, the armature potential remains approximately the same at all speeds of the field, provided a constant potential is impressed upon the rings, while the auto-transformer 30 varies the potential impressed upon the stator and changes the relationship between the varying stator counter-potential and the constant armature potential. Another means of varying and adjusting the speed is by varying the potential impressed upon the armature, which may be done by means of an auto-transformer 31 inserted between the source of alternating current 13 and the armature slip rings 11. When this expedient is employed, the auto-transformer 30 between the commutator brushes and stator winding may be omitted and the connections arranged permanently.

When the auto-transformer 31 is employed, the operation is as follows: When the armature has been synchronized with the armature field of the field member the impressed potential on the armature is varied by means of the auto-transformer 31 and the armature field is adjusted to give the desired power factor. The potential at the commutator brushes will be proportionate with that impressed upon the armature. The stator field magnets in this case may remain fully excited and constant, and thus the auto-transformer 31 which controls the impressed potential also serves to vary the relation between the potential at the commutator brushes and the counter-potential of the stator winding, thereby adjusting the speed to any desired value. It is to be noted that the speed, when once so adjusted, will remain substantially constant at varying loads, and can not rise above a point where the stator counter-potential equals that of the armature potential.

If desired, the apparatus may be made self-exciting, and for this purpose the field member is shown as carrying two brushes 32 and 33, which are connected to the fields through the leads 34 and 35, and these brushes wipe the commutator and are so arranged as to receive and deliver the required direct current. Switches 36 and 37 are provided for the purpose of disconnecting the brushes 32 and 33 from the field coils when it is desired to provide the device with separate excitation.

The source of supply 13 is shown as a polyphase alternating current generator, although it is manifest that a single phase alternating current may be employed. It will be observed that this construction offers the advantage of manipulating comparatively small field currents instead of polyphase power currents. Furthermore, the revolving field structure is simple and strong. Due to the peculiar arrangements of the poles and connecting yokes, the entire field structure may be cast in one piece and the supporting spider 18 may also be of steel, since only such pole faces are joined thereby as are of the same polarity. The structure is thereby rendered strong and economical, and simple of manufacture.

I claim:

1. A dynamo-electric machine comprising a rotatable armature and a winding therefor, a stator element and a winding therefor, a rotatable field member arranged in inductive relation to both the armature and stator windings, a source of alternating current for the armature, and means for transferring current from the armature to the stator element.

2. A dynamo-electric machine comprising a rotatable armature member including a winding and a commutator, stationary brushes engaging the commutator, a stator and a winding therefor connected to the brushes, a source of alternating current for the armature winding, a rotatable field member having an armature flux component in inductive relation to the armature winding and a stator flux component in inductive relation to the stator winding, and means for varying the relative strength of the two flux components.

3. A dynamo-electric machine comprising a rotatable armature member including a winding and a commutator, stationary brushes engaging the commutator, a stator and a winding therefor connected to the brushes, a source of alternating current for the armature winding, a rotatable field member having an armature flux component in inductive relation to the armature winding and a stator flux component in inductive relation to the stator winding, and means for varying the relative strength and direction of the two flux components.

4. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, a rotatable field member having an armature flux component in inductive relation to the armature winding and a stator flux component in inductive relation to the stator winding, and means for varying the relative strength of the two flux components.

5. A dynamo-electric machine comprising a rotatable armature member including a winding and a commutator and stationary polyphase spaced brushes engaging the commutator, a stator and a polyphase winding therefor connected to the polyphase brushes, a source of alternating current for the armature winding, two sets of field magnets mounted for common rotation between the stator and converter member, one set constituting armature field poles in inductive relation to the armature winding and the other set constituting stator field poles in inductive relation to the stator winding, and means for varying the relative strength and polarity of the two sets of field magnets.

6. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, two sets of field magnets mounted for common rotation between the stator and armature member, one set constituting armature field poles in inductive relation to the armature winding and the other set constituting stator field poles in inductive relation to the stator winding, and means for varying the relative strength of the two sets of field magnets.

7. A dynamo-electric machine comprising a rotatable armature member including a winding and a commutator and stationary polyphase spaced brushes engaging the commutator, a stator and polyphase winding therefor connected to the polyphase spaced brushes, a source of alternating current for the armature winding; a rotatable field member disposed between the armature member and the stator including two sets of field magnets, one set constituting armature field poles in inductive relation to the armature winding and the other set constituting stator field poles in inductive relation to the stator winding, and two brushes carried by the rotatable field member and engaging the commutator and arranged to take direct current therefrom, the brushes having electrical connection with the respective sets of field magnets.

8. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, and a rotatable field member having an armature field component in inductive relation to the armature winding and a stator field component in inductive relation to the stator winding, the armature member being adapted to rotate in synchronism with the armature field component.

9. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, a rotatable field member having an armature field component in inductive relation to the armature winding and a stator field component in inductive relation to the stator winding, the armature member being adapted to rotate in synchronism with the armature field component, and means for varying the potential impressed upon the stator.

10. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, a rotatable field member having an armature field component in inductive relation to the armature winding and a stator field component in inductive relation to the stator winding, the armature member being adapted to rotate in synchronism with the armature field component, and means for varying the potential impressed upon the armature.

11. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, a rotatable field member having an armature field component in inductive relation to the armature winding and a stator field component in inductive relation to the stator winding, the armature member being adapted to rotate in synchronism with the armature field component, and means for varying the relation between the electromotive force impressed upon the armature and the counter-electromotive force of the stator winding.

12. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, a rotatable field member having an armature field component in inductive relation to the armature winding and a stator field component in inductive relation to the stator winding, the armature member being adapted to rotate in synchronism with the armature field component, and means for varying the strength of the stator field component.

13. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, a rotatable field member having an armature field component in inductive relation to the armature winding and a stator field component in inductive relation to the stator winding, the armature member being adapted to rotate in synchronism with the armature field component, and means for varying the strength of the two field components.

14. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, a rotatable field member having an armature field component in inductive relation to the armature winding and a stator field component in inductive relation to the stator winding, the armature member being adapted to rotate in synchronism with the armature field component, and means for varying the relative strength and polarity of the two field components.

15. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, a rotatable field member having an armature field component in inductive relation to the armature winding and a stator field component in inductive relation to the stator winding, the armature member being adapted to rotate in synchronism with the armature field component, and an auto-transformer arranged between the polyphase brushes and the stator winding.

16. A dynamo-electric machine comprising a rotatable armature member including a winding and a commutator, stationary polyphase spaced brushes engaging the commutator, a stator and a polyphase winding therefor connected to the polyphase spaced brushes, a source of alternating current for the armature winding, a rotatable field member having an armature field component in inductive relation to the armature winding and a stator field component in inductive relation to the stator winding, the armature member being adapted to rotate in synchronism with the armature field component, and an auto-transformer arranged between the source of alternating current and the armature winding.

17. A dynamo-electric machine comprising a rotatable armature member including a winding and a commutator, stationary polyphase brushes engaging the commutator, a stator and a polyphase winding therefor connected to the polyphase brushes, a source of alternating current in the armature winding; a rotatable field member including a plurality of pole pieces, magnetic yokes connecting the external pole faces of the alternate pole pieces with the internal pole faces of the intermediate pole pieces, thereby forming an external and an internal set of pole pieces and two sets of magnetizing coils, one set for each set of pole pieces, constituting stator field poles in inductive relation to the stator winding and armature field poles in inductive relation to the armature; and means for varying the strength of the stator field poles.

18. A dynamo-electric machine comprising a rotatable armature member including a winding and a commutator, stationary polyphase brushes engaging the commutator, a stator and a polyphase winding therefor connected to the polyphase brushes, a source of alternating current for the armature winding; a rotatable field member including a plurality of pole pieces, magnetic yokes connecting the external pole faces of the alternate pole pieces with the internal pole faces of the intermediate pole pieces, thereby forming an external and an internal set of pole pieces and two sets of magnetizing coils, one set for each set of pole pieces, constituting stator field poles in inductive relation to the stator winding and armature field poles in inductive relation to the armature; and means for varying the relative strength and polarity of the two sets of field poles.

In witness whereof I subscribe my signature, in the presence of two witnesses.

ALFONS H. NEULAND.

Witnesses:
VICTOR D. BORST,
WALDO M. CHAPIN.